United States Patent [19]

Achiha

[11] Patent Number: 4,970,601
[45] Date of Patent: Nov. 13, 1990

[54] VIDEO SIGNAL PROCESSING APPARATUS FOR VIDEO TAPE RECORDER

[75] Inventor: Masahiko Achiha, Iruma, Japan

[73] Assignee: Hitachi, Ltd., Tokyo, Japan

[21] Appl. No.: 153,602

[22] Filed: Feb. 8, 1988

[30] Foreign Application Priority Data

Mar. 6, 1987 [JP] Japan .................................. 62-50034

[51] Int. Cl.$^5$ ............................................. H04N 9/80
[52] U.S. Cl. ................................................. 358/330
[58] Field of Search ............... 358/310, 320, 330, 31, 358/906, 335

[56] References Cited

U.S. PATENT DOCUMENTS

| | | | |
|---|---|---|---|
| 3,968,514 | 7/1976 | Narahara et al. | 358/310 |
| 4,490,749 | 12/1984 | Hirota | 358/330 |
| 4,507,689 | 3/1985 | Kozuki et al. | 358/906 |
| 4,530,004 | 7/1985 | Achiha et al. | 358/31 |
| 4,698,694 | 10/1987 | Tomita et al. | 358/310 |
| 4,739,390 | 4/1988 | Achiha et al. | 358/31 |
| 4,772,961 | 9/1988 | Ichinoi | 358/335 |
| 4,873,580 | 10/1989 | Katoh et al. | 358/906 |
| 4,884,151 | 11/1989 | Ohtsu et al. | 358/906 |

FOREIGN PATENT DOCUMENTS

| | | | |
|---|---|---|---|
| 58-129892 | 3/1983 | Japan | 358/31 |
| 60-57789 | 3/1985 | Japan | 358/31 |

Primary Examiner—Donald McElheny, Jr.
Attorney, Agent, or Firm—Antonelli, Terry, Stout & Kraus

[57] ABSTRACT

A video signal recording/reproducing apparatus for recording and reproducing a composite color television signal which is produced in such a manner that a modulated chrominance signal (namely, C-signal) is formed by modulating a color subcarrier with a color difference signal, and then superposed on a high frequency portion of a luminance signal (namely, Y-signal). In order to reconstruct a color picture from the composite color telvision signal without producing cross talk such as cross color and cross luminance, the input of the apparatus is provided with a YC seperation circuit for separating the composite color television signal into Y- and C-signals by utilizing a frame memory, the Y- and C-signals thus obtained are modulated independently of each other at the recording part of the apparatus, to be recorded in a recording medium, and the reproducing part of the apparatus is provided with an output circuit for delivering Y- and C-signals which are reproduced from the recording medium, in a state that the reproduced Y- and C-signals are substantially separated from each other.

4 Claims, 2 Drawing Sheets

FIG. 3
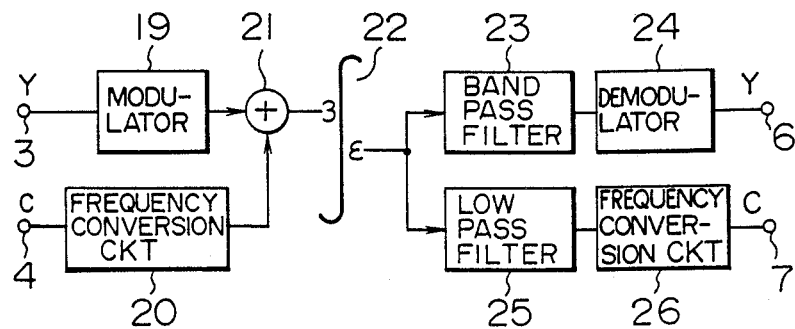
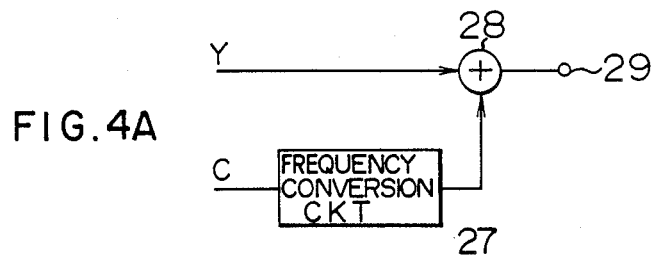
FIG.4A
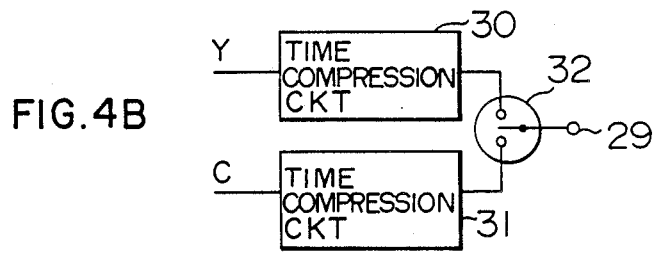
FIG.4B
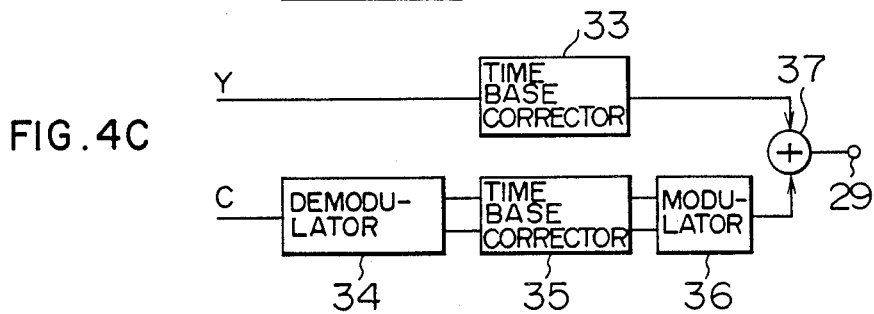
FIG.4C

VIDEO SIGNAL PROCESSING APPARATUS FOR VIDEO TAPE RECORDER

BACKGROUND OF THE INVENTION

1. Field of the Invention

The present invention relates to a video signal recording/reproducing apparatus suitable for use in a home use video tape recorder or the like, and more particularly to a video signal recording/reproducing apparatus capable of reconstructing a high-quality picture image without cross color and cross luminance.

2. Description of the Prior Art

In a home use video tape recorder or the like, recording and reproducing operations are performed in the following manner. That is, a composite color television signal which is produced in such a manner that a modulated chrominance signal (namely, C-signal) is formed by modulating a color subcarrier with a color difference signal and is then superposed on a high frequency portion of a luminance signal (namely, Y-signal), is applied to the video tape recorder or the like, and is separated by a low pass filter and a band pass filter into the Y- and C-signals. The color subcarrier of the C-signal separated from the composite signal is subjected to frequency conversion so as to have a frequency of about 700 kHz, and the C-signal thus obtained is superposed on a frequency-modulated Y-signal, to form a resultant signal recorded on a magnetic tape. Further, a part of a signal read out from the magnetic tape is demodulated to obtain the Y-signal, and another part of the read-out signal is subjected to frequency conversion to obtain the C-signal. The Y-and C-signals thus obtained are added to each other to form a composite color television signal which is applied to a television receiver. However, the reproduced video signal contains a jitter, and thus the frequency of the color subcarrier does not satisfy the offset condition; odd multiple of half the horizontal scanning frequency.

In some video tape recorders, the separation of the Y- and C-signals in the recording operation is made by using a line memory. In this case, also, the reproduced output signal does not satisfy the above offset condition, and hence the cross talk between the luminance signal and the color difference signal is inevitable.

SUMMARY OF THE INVENTION

An object of the present invention is to provide a video signal recording/reproducing apparatus which reconstruct and display a color picture image without producing cross talk such as cross color and cross luminance.

In order to attain the above object, according to the present invention, there is provided a video signal recording/reproducing apparatus, in which a separation circuit for separating a composite color television signal into Y- and C-signals by using a frame memory is provided in a recording part, and reproduced Y- and C-signals are delivered from a reproducing part in a state that the reproduced C- and Y-signals are separated from each other.

The inter-frame YC separation using a frame memory utilizes a fact that the color subcarrier of a composite color television signal is opposite in phase to that in the adjacent frame. That is, the modulated chrominance signal (namely, C-signal) is obtained by subtracting one frame from the other frame, and the luminance signal (namely, Y-signal) is obtained by subtracting the C-signal from the composite color television signal. Thus, the C- and Y-signals can be separated from each other without producing cross talk therebetween. The Y- and C-signals separated by the inter-frame YC separation are recorded in a recording medium by an ordinary modulating/recording method. Thus, Y- and C-signals can be reproduced from a signal read out of the recording medium, in a state that cross talk is not present between the Y- and C-signals. However, each of the reproduced Y- and C-signals has a jitter. Hence, when the reproduced Y- and C-signals are superposed on each other to form a composite color television signal, it is impossible to separate the composite color television signal by a television receiver into Y- and C-signals without cross talk therebetween. According, to the present invention, the reproduced Y- and C-signals are delivered without being superposed or each other. Thus, a high-quality picture can be reconstructed and displayed which does not contain the cross talk between the Y- and C-signals.

The above object and features of the present invention will be more apparent from the following description taken in conjunction with the accompanying drawings.

BRIEF DESCRIPTION OF THE DRAWINGS

FIG. 3 is a block diagram showing the circuit configuration of the recording/reproducing circuit of FIG. 1.

FIGS. 4A, 4B and 4C are block diagrams showing examples of the output portion of the recording/reproducing circuit of FIG. 1.

DESCRIPTION OF THE PREFERRED EMBODIMENT

Figure 1:
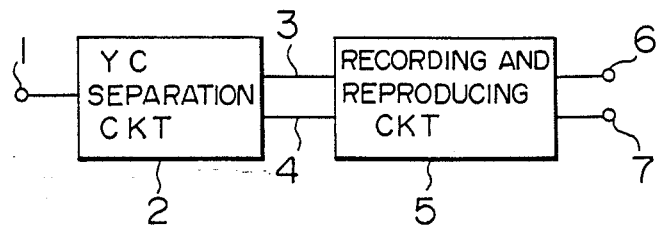
FIG. 1 is a block diagram showing the whole construction of an embodiment of a video signal recording-/reproducing apparatus according to the present invention.

FIG. 1 shows the fundamental construction of an embodiment of a video signal recording/reproducing apparatus according to the present invention. Referring to FIG. 1, a composite color television signal such as an NTSC signal is applied to an inter-frame YC separation circuit 2 through an input terminal 1. The separation circuit 2 utilizes a frame memory to separate the composite color television signal into a luminance signal (namely, Y-signal) and a modulated chrominance signal (namely, C-signal). The Y- and C- signals separated from each other are applied to a recording/reproducing circuit 5, to be recorded in a recording medium such as a magnetic tape. Further, in the recording/reproducing circuit 5, a signal read out from the recording medium is separated into Y- and C-signals, which are sent to output terminals 6 and 7, respectively.

Figure 2A:
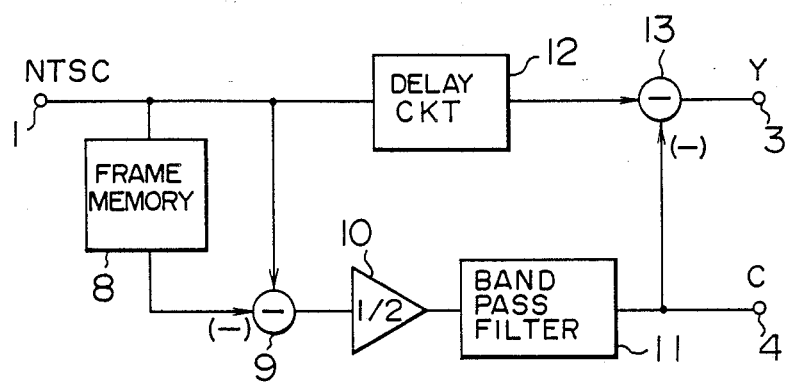
FIGS. 2A and 2B are block diagrams showing examples of the inter-frame YC separation circuit of FIG. 1.
Figure 2B:
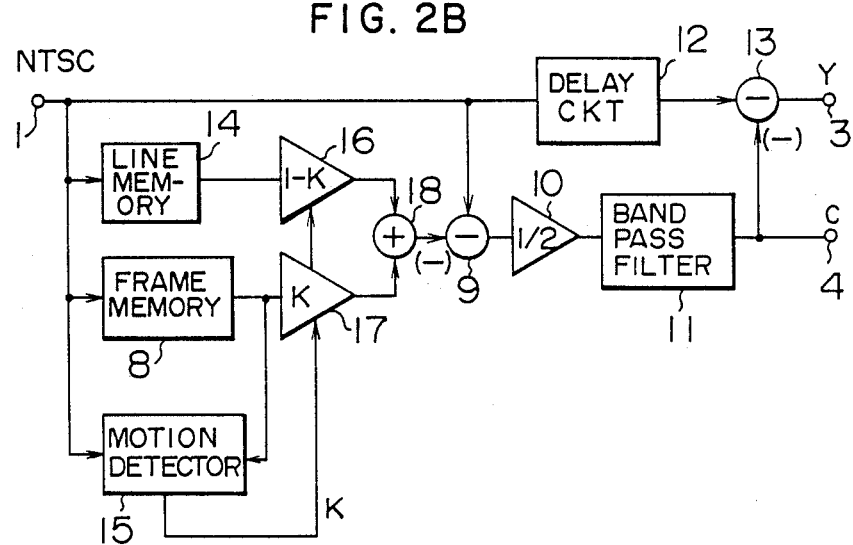

FIGS. 2A and 2B shows examples of the interframe YC separation circuit 2. Referring to FIG. 2A, a composite color television signal, for example, an NTSC signal is applied through the input terminal 1 to a frame memory 8 having a capacity of 525H (where H indicates a horizontal scanning period), and then applied to a subtracter 9 together with the NTSC signal from the input terminal 1, to obtain a frame-difference signal. The output of the subtracter 9 is applied to a band pass filter 11 which can extract the modulated chrominance signal (namely, C-signal), through a coefficient circuit 10. The C-signal from the band pass filter 11 is sent to an output terminal 4 and another subtracter 13. The NTSC signal, that is, the input signal is delayed by a delay circuit 12, and then applied to the subtracter 13, to subtract the C-signal from the input signal, thereby obtaining the luminance signal (namely, Y-signal). The Y-signal thus obtained is sent to an output terminal 3. The delay time of the delay circuit 12 is equal to the delay due to the band pass filter 11. In a case where an input signal indicating a stationary picture is applied to the input terminal 1, the input signal is separated by the circuit configuration of FIG. 2A into ideal Y- and C-signals which do not have cross talk. While, in a case where an input signal indicating a moving picture is applied to the input terminal 1, the correlation between frames is impaired, and the cross talk between the Y- and C-signals is increased. In this case, it is preferable to use a motion adaptive circuit shown in FIG. 2B. Referring to FIG. 2B, an input signal (that is, an NTSC signal) applied to the input terminal 1 is sent to the frame memory 8, a line memory 14 having a capacity of 1H, and a motion detector 15. By using the output signal of the frame memory 8, the motion detector 15 checks whether an object moves or not and determines a motion coefficient k (where $0 \leq k \leq 1$). The motion coefficient k is nearly equal to one for a stationary picture, and is nearly equal to zero for a moving picture which has a large difference between frames. Coefficient values k and $(1-k)$ set in coefficient circuits 16 and 17 are determined by the motion coefficient k, and the outputs of the coefficient circuits 16 and 17 are applied to an adder 18. Thus, an input signal which precedes the present input signal by one line, and an input signal which precedes the present input signal by one frame, are mixed by the adder 18, and the mixing ratio is determined by the motion coefficient k. The output of the adder 18 and the input signal are applied to the subtractor 9, to subtract the output of the adder 18 from the input signal. A circuit part on the output side of the subtracter 9 has the same circuit configuration and operation as the blocks 10 to 14 of FIG. 2A, and hence explanation of the above circuit part will be omitted. When the motion adaptive circuit of FIG. 2B is used, an input signal in a stationary picture area is separated into ideal Y- and C-signals which do not have cross talk, and an input signal in a moving picture area is separated by a line-comb filter into Y- and C-signals.

FIG. 3 shows the circuit configuration of an example of the recording/reproducing circuit 5 shown in FIG. 1. Referring to FIG. 3, the Y-signal which is delivered to the output terminal 3 and does not have cross talk between the Y- and C-signals, is frequency modulated by a modulation circuit 19. While, the frequency of the color subcarrier of the C-signal which is delivered to the output terminal 4 and does not have cross talk between the Y- and C-signals, is reduced to about 700 kHz by a frequency conversion circuit 20. The C-signal thus processed is added to the frequency modulated Y-signal by an adder 21 to form a resultant signal, which is recorded in a recording medium 22 such as a magnetic tape. In a reproducing part, a signal read out from the recording medium 22 is applied to a band pass filter 23 and a low pass filter 25, to be separated into the frequency-modulated Y-signal and the C-signal whose subcarrier frequency has been reduced to about 700 kHz. The frequency-modulated Y- signal and the frequency-reduced C-signal are reconstructed to original Y- and C-signals by a demodulation circuit 24 and a frequency conversion circuit 26, respectively. The original Y- and C-signals thus obtained are sent to the output terminals 6 and 7, respectively. The Y- and C-signals contain jitter due to the magnetic tape or the like, but do not have cross talk therebetween. In a conventional home use video tape recorder or the like, the Y- and C-signals appearing on the output terminals 6 and 7 added to each other, to form a composite color television signal. However, when Y- and C-signal having jitter are added to form a composite color television signal, it is impossible to separate the television signal into Y- and C-signals which do not have cross talk, and thus a high-quality picture image cannot be obtained.

In the above, explanation has been made of a case where the Y- and C-signals separated from each other are sent out from different output terminals. However, the Y- and C-signals can be sent out from a single output terminal.

FIGS. 4A to 4C show examples of an output portion for sending out the Y- and C-signals from a single output terminal. In an output portion shown in FIG. 4A, the subcarrier frequency of the C-signal is changed to a frequency of 5 to 6 MHz by a frequency conversion circuit 27, and the C-signal thus processed is added to the Y-signal by an adder 28, to obtain a resultant signal, which is sent to an output terminal 29. Since a frequency of 5 to 6 MHz is outside the frequency band of the Y-signal, the resultant signal can be readily separated by a television receiver into Y- and C-signals without cross talk. That is, the Y- and C-signals can be taken out by a low pass filter and a band pass filter, respectively. The frequency conversion circuits 26 and 27 may be merged into a frequency conversion circuit which converts from the frequency-reduced C-signal into a frequency of 5 to 6 MHz. In the output portion shown in FIG. 4B, the Y- and C-signals are subjected to time compression at time compression circuits 30 and 31, respectively, and the output of the circuit 30 corresponding to one line and the output of the circuit 31 corresponding to one line are alternately applied to the output terminal 29 by a changeover circuit 32, to form a time-division multiplexed signal. The multiplexed signal thus obtained can be readily separated by a television receiver into the time-compressed Y- and C-signals, which are returned to the original Y- and C-signals by time expansion circuits. In the output portion shown in FIG. 4C, the C-signal is demodulated by a demodulation circuit 34, to obtain two kinds of color difference signals. The color difference signals are applied to a time base correction circuit 35, to remove jitter from the color difference signals. Further, the Y-signal is applied to another time base correction circuit 33 to remove a jitter from the Y-signal. The jitter-free color difference signals from the circuit 35 are subjected to quadrature modulation at a modulation circuit 36, to obtain a jitter-free C-signal. The jitter-free Y-signal from the circuit 33 is added to the jitter-free C-signal from the circuit 36 by an adder 37, to send out a composite color television signal according to the present broadcasting technical standard to the output terminal 29. In this case, a YC separation circuit including a frame memory, that is, the same YC separation circuit as shown in FIG. 2A or 2B is used on the television receiver side, to separate the composite color television signal from the output terminal into Y- and C-signals which do not have cross talk. As mentioned above, the resultant signal from each of the output portions shown in FIGS. 4A to 4C can be separated by a television receiver into Y- and C-signals which do not have cross talk. Thus, each output portion is considered to deliver Y- and C-signals which are substantially separated from each other.

A YC separation circuit including a frame memory is used only in a recording operation. Hence, the frame memory may be used by a different circuit in a reproducing operation. For example, the frame memory can be used to construct a frame recursive type noise reducing circuit, or to improve the picture quality of a reconstructed picture due to a still picture reproducing operation or a variable speed reproducing operation. In these cases, the frame memory is common to the recording and reproducing parts, and hence it is necessary to provide on the input side of the frame memory changeover means for changing one of an input signal for recording and an input signal for reproduction over to the other input signal, and to provide similar changeover means on the output side of the frame memory. In a recording mode, a composite color television signal is stored in the frame memory. While, in a reproducing mode, Y- and C-signals separated from each other are stored in the frame memory. In a reproducing operation, it is preferable to store the Y- and C- signals in different areas of the frame memory, or to form a multiplex signal by one of the output portions shown in FIGS. 4A to 4C.

As has been explained in the foregoing, according to the present invention, a composite color television signal is recorded in a recording medium without being degraded by cross talk such as cross color and cross luminance, and a signal read out from the recording medium is separated into Y- and C-signals and then outputted in a state that the Y- and C-signals are substantially separated from each other. That is, it is not required to use a YC separation circuit on the television receiver side, and hence Y- and C-signals used in a television receiver are scarcely affected by a jitter contained in the read-out signal. Thus, according to the present invention, a high-quality color picture image can be displayed.

I claim:

1. A video signal recording/reproducing apparatus for recording and reproducing a composite color television signal, comprising:
    an input terminal applied with a composite color television signal;
    a separation circuit for separating the composite color television signal from the input terminal into a luminance signal and a modulated chrominance signal by making use of a frame memory;
    a recording circuit for putting the luminance signal and the modulated chrominance signal which has been separated from each other by the separation circuit in different frequency bands, to record the luminance signal and the modulated chrominance signal in a recording medium;
    an output part for reproducing the luminance signal and the modulated chrominance signal from a signal which is read out of the recording medium, and for delivering the luminance signal and the modulated chrominance signal in a state that the luminance signal and the modulated chrominance signal are substantially separated from each other, the output part including a band pass filter for extracting the luminance signal from the signal read out of the recording medium, a first demodulator for demodulating the output of the band pass filter, a low pass filter for extracting the modulated chrominance signal from the signal read out of the recording medium, a frequency conversion circuit for increasing the carrier frequency of the output of the low pass filter, a first terminal applied with the output of the first demodulator, and a second output terminal applied with the output of the frequency conversion circuit; and
    a first time compression circuit for subjecting the output of the first demodulator to time compression, a second time compression circuit for subjecting the output of the frequency conversion circuit to time compression, and a changeover circuit for delivering the output of the first time compression circuit and the output of the second time compression circuit, alternately.

2. A video signal recording/reproducing apparatus for recording and reproducing a composite color television signal, comprising:
    an input terminal applied with a composite color television signal;
    a separation circuit for separating the composite color television signal from the input terminal into a luminance signal and a modulated chrominance signal by making use of a frame memory;
    a recording circuit for putting the luminance signal and the modulated chrominance signal which has been separated from each other by the separation circuit in different frequency bands, to record the luminance signal and the modulated chrominance signal in a recording medium, the recording circuit including a first modulator for frequency-modulating the luminance signal separated from the modulated chrominance signal, a first frequency conversion circuit for reducing the carrier frequency of the modulated chrominance signal separated from the luminance signal, and means for combining the outputs of the first modulator and the first frequency conversion circuit to form a resultant signal, and for recording the resultant signal int he recording medium;
    an output part for reproducing the luminance signal and the modulated chrominance signal from a signal which is read out of the recording medium, and for delivering the luminance signal and the modulated chrominance signal in a state that the luminance signal and the modulated chrominance signal are substantially separated from each other, the output part including a band pass filter for extracting the luminance signal which has been frequency-modulated by the first modulator, from the signal read out of the recording medium, a first demodulator for demodulating the output of the band pass filter, a low pass filter for extracting the modulated chrominance signal whose carrier frequency has been reduced by the first frequency conversion circuit, from the signal read out of the recording medium, and a second frequency conversion circuit for increasing the carrier frequency of the output of the low pass filter, a first output terminal applied with the output of the first demodulator, and a second output terminal applied with the output of the second frequency conversion circuit, and
    a first time compression circuit for subjecting the output of the first demodulator to time compression, a second time compression circuit for subjecting the output of the second frequency conversion circuit to time compression, and a changeover circuit for delivering the output of the first time compression circuit and the output of the second time compression circuit, alternately.

3. A video signal recording/reproducing apparatus for recording and reproducing a composite color television signal, comprising:

an input terminal applied with a composite color television signal;

a separation circuit for separating the composite color television signal from the input terminal into a luminance signal and a modulated chrominance signal by making use of a frame memory;

a recording circuit for putting the luminance signal and the modulated chrominance signal which has been separated from each other by the separation circuit in different frequency bands, to record the luminance signal and the modulated chrominance signal in a recording medium;

an output part for reproducing the luminance signal and the modulated chrominance signal from a signal which is read out of the recording medium, and for delivering the luminance signal and the modulated chrominance signal in a state that the luminance signal and the modulated chrominance signal are substantially separated from each other, the output part including a band pass filter for extracting the luminance signal from the signal read out of the recording medium, a first demodulator for demodulating the output of the band pass filter, a low pass filter for extracting the modulated chrominance signal from the signal read out of the recording medium, a frequency conversion circuit for increasing the carrier frequency of the output of the low pass filter, a first terminal applied with the output of the first demodulator, and a second output terminal applied with the output of the frequency conversion circuit; and a first time base corrector for removing a jitter from the output of the first demodulator, a second demodulator for demodulating the output of the frequency conversion circuit, a second time base corrector for removing a jitter from the output of the second demodulator, a modulator for modulating the output of the second time base corrector, and a circuit for combining the output of the first time base corrector and the output of the modulator.

4. A video signal recording/reproducing apparatus for recording and reproducing a composite color television signal, comprising:

an input terminal applied with a composite color television signal;

a separation circuit for separating the composite color television signal from the input terminal into a luminance signal and a modulated chrominance signal by making use of a frame memory;

a recording circuit for putting the luminance signal and the modulated chrominance signal which has been separated from each other by the separation circuit in different frequency bands, to record the luminance signal and the modulated chrominance signal in a recording medium, the recording circuit including a first modulator for frequency-modulating the luminance signal separated from the modulated chrominance signal, a first frequency conversion circuit for reducing the carrier frequency of the modulated chrominance signal separated from the luminance signal, and means for combining the outputs of the first modulator and the first frequency conversion circuit to form a resultant signal, and for recording the resultant signal in the recording medium;

an output part for reproducing the luminance signal and the modulated chrominance signal from a signal which is read out of the recording medium, and for delivering the luminance signal and the modulated chrominance signal in a state that the luminance signal and the modulated chrominance signal are substantially separated from each other, the output part including a band pass filter for extracting the luminance signal which has been frequency-modulated by the first modulator, from the signal read out of the recording medium, a first demodulator for demodulating the output of the band pass filter, a low pass filter for extracting the modulated chrominance signal whose carrier frequency has been reduced by the first frequency conversion circuit, from the signal read out of the recording medium, and a second frequency conversion circuit for increasing the carrier frequency of the output of the low pass filter, a first output terminal applied with the output of the first demodulator, and a second output terminal applied with the output of the second frequency conversion circuit, and a first time base corrector for removing a jitter from the output of the first demodulator, a second demodulator for demodulating the output of the second frequency conversion circuit, a second time base corrector for removing a jitter from the output of the second demodulator, a second modulator for modulating the output of the second time base corrector, and a circuit for combining the output of the first time base corrector and the output of the second modulator.

* * * * *